March 21, 1961     O. B. SHERMAN     2,975,471

APPARATUS FOR SEVERING PLASTIC MATERIAL

Filed June 24, 1957     3 Sheets-Sheet 1

INVENTOR.
ORVILLE B. SHERMAN
ATTORNEYS

INVENTOR.
ORVILLE B. SHERMAN
BY
ATTORNEYS

March 21, 1961  O. B. SHERMAN  2,975,471
APPARATUS FOR SEVERING PLASTIC MATERIAL
Filed June 24, 1957  3 Sheets-Sheet 3

INVENTOR.
ORVILLE B. SHERMAN
BY
ATTORNEYS

United States Patent Office 2,975,471
Patented Mar. 21, 1961

2,975,471
APPARATUS FOR SEVERING PLASTIC MATERIAL

Orville B. Sherman, Toledo, Ohio, assignor to Owens-Illinois Glass Company, a corporation of Ohio Filed June 24, 1957, Ser. No. 667,335

1 Claim. (Cl. 18—5)

My invention relates to the production of plastic articles such as containers, bottles, jars, etc., wherein plastic material is extended from an orifice in tubular form, enclosed in a mold and blown to final shape in said mold.

In the usual machines for making such blown articles, it is inherent to the process that the blown article, as discharged from the blow mold, will have an excess portion of material attached to the bottom thereof. This is then removed by tearing or stripping same from the article.

It is an object of this present invention to produce a blown article which, when discharged from the blow mold, is complete in every detail and which does not require any further operations to render it usable.

A further object is to provide a compound shearing device adapted to simultaneously sever the excess material from both the blown article and from the source of material supply.

Further objects will be apparent from the drawings and the following descriptive material.

Figure 1:
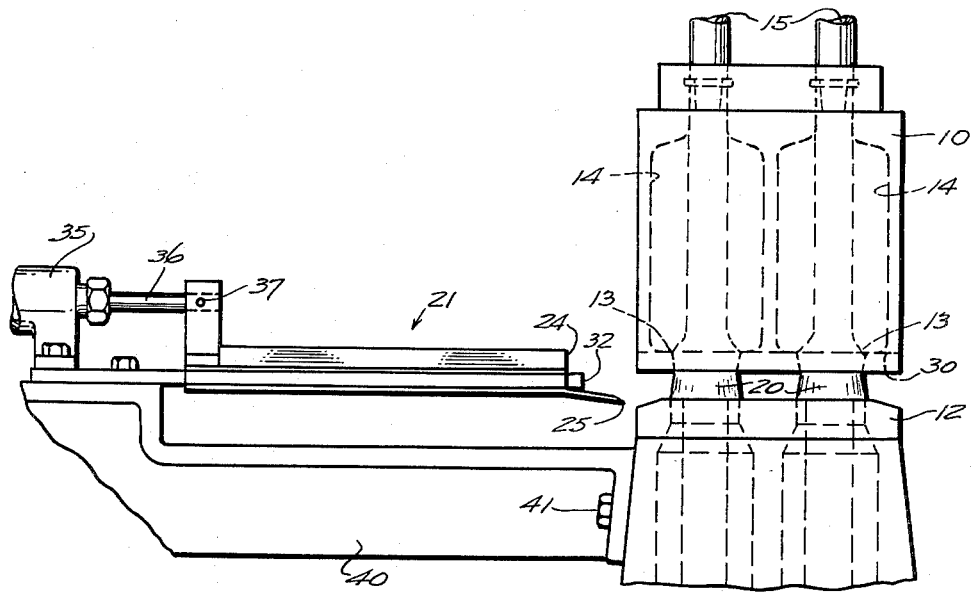
Fig. 1 is a side elevation illustrating the cooperative relationship between the shear mechanism, the blow mold and the extrusion head.
Figure 2:
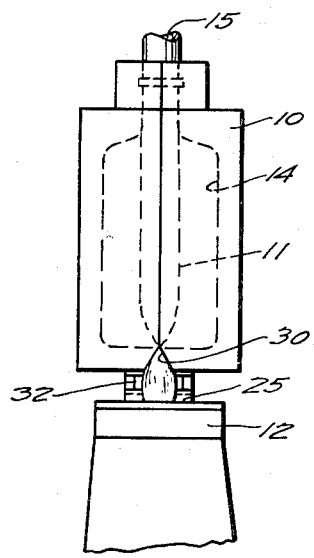
Fig. 2 is an end view of the mechanism.
Figure 3:
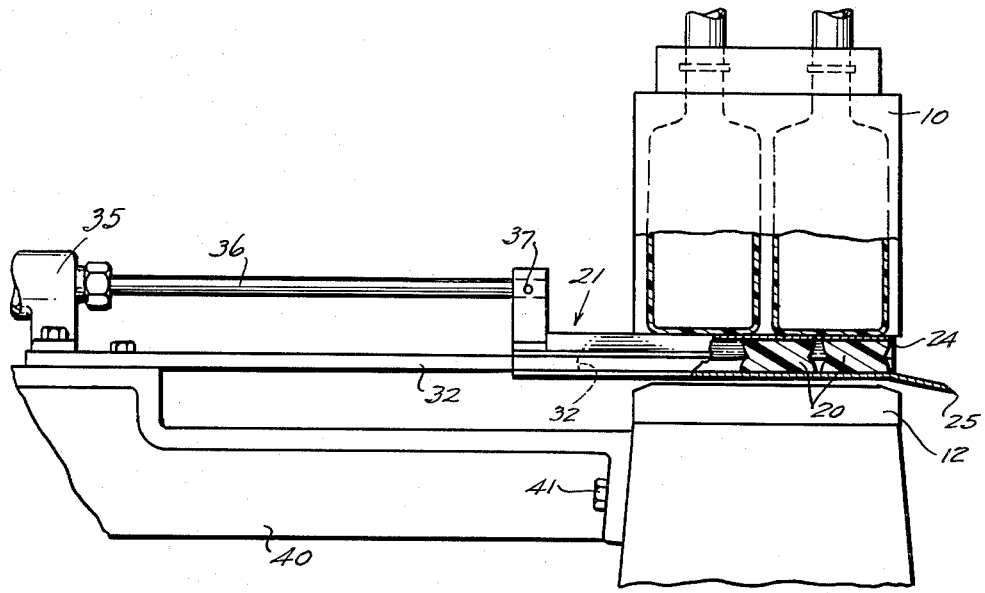
Fig. 3 is a part sectional elevation showing shearing operation as completed.
Figure 4:
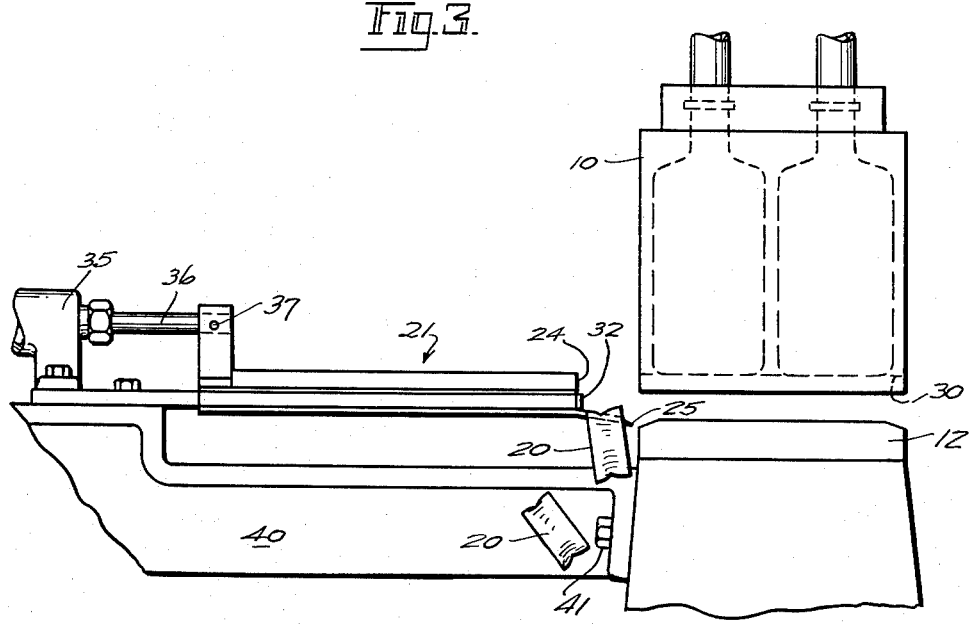
Fig. 4 is a side elevation showing the shear parts back in the starting position and the severed material being discharged therefrom.
Figure 5:
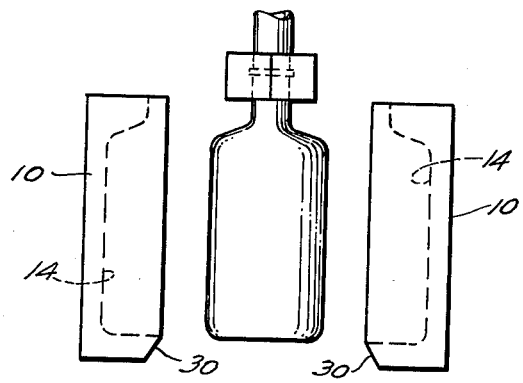
Fig. 5 shows the blow mold in open position disclosing the trimmed blown article.
Figure 6:
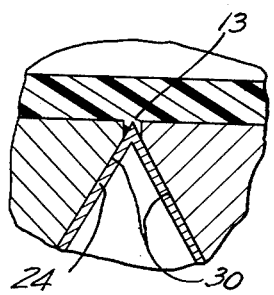
Fig. 6 is an enlarged sectional view at the point of shearing between the mold and the shear blade.
Figure 7:
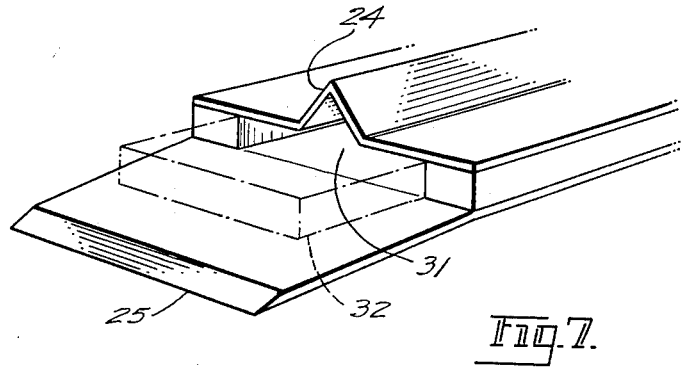
Fig. 7 is an enlarged view of the multiple shear blades.

Referring specifically to Fig. 1, the blow mold 10 is shown as closed around the tube 11 which has been extruded from the extrusion nozzle 12. The mold 10 pinches and seals the ends of tube 11, as at 13, prior to expanding same to the confines of the cavity 14 of mold 10 by applying air through opening 15 to the inside of the tube 11.

With the closing of mold 10 the extrusion of tubular material from nozzle 12 ceases thereby leaving a moil or excess material 20 extending between the bottom of mold 10 and the top of the nozzle 12.

When the mold 10 has been closed pinching and sealing the tube 11 at the point of junction of the mold's halves, as at 13, the shear assembly 21, which is provided with two cutting edges 24 and 25, is moved across the top of nozzle 12 to bring the shear edge 25 into shearing contact therewith, severing the extruded material from the source of supply. Simultaneous therewith, the shear edge 24 also moves across the mold bottom bringing the V-shaped shear 24 into shearing relationship with a corresponding V-shape 30, formed along the parting line between the halves of the mold 10, and shearing the excess plastic material at the point of the tube seal from that within the mold. The shear blade 25 is so constructed that it functions as a spring thus providing a condition whereby the members 24 and 25 are held against their complementary members, namely mold 10 and nozzle 12, under spring pressure during the shearing operation.

This movement of the shear edges 24 and 25 simultaneously sever the material both at the mold bottom and the extrusion orifice thereby forming a separated moil portion or portions 20. These severed portions will, during the severing operation, move into the cavity 31 formed between the shear edges 24 and 25 and upon the reverse stroke of the shear assembly 21 travel therewith. As the shear assembly moves back on its reverse stroke, carrying the severed moils 20 therewith, a point is eventually reached where the end of a moil expelling member 32 contacts the moil 20 forcing it out of the cavity 31 and discharge same therefrom.

The shear assembly is actuated through a cylinder 35 having a piston rod 36 to which the shear assembly 21 is attached as at 37.

The shear assembly is supported upon a bracket 40 attached to the nozzle 12 as at 41.

The actuation of the shear assembly 21 may be controlled through usual timing device, utilized to operate the article forming machine, in order that its motions will be in timed sequence with those of the machine. Such timing devices are the commonly used and well known driven devices utilized in the usual article forming machines and is not shown or described herein.

In general the operation of the described mechanism is about as follows;

A usual finished neck portion of an article is formed by injecting plastic material into the neck cavity 16 of a neck mold 17, the neck mold moves away from the nozzle 12 and a tubular extrusion issues from nozzle 12 integral with the material of said neck mold 17.

When a sufficient length of tube 11 has been extruded the mold 10 closes about same and the extrusion ceases.

Concurrently, therewith, the shear assembly 21 is moved across the bottom of the mold 10 and top of the nozzle 12 and simultaneously severs the material 20 residing between the mold 10 and the nozzle 12. The moil 20 may be discharged either at the end of the shear stroke or be returned with the shear assembly and be discharged therefrom at the end of the retraction stroke of the shear assembly 21.

The location of the shear edges 24 and 25 may be shifted with respect to each other, that is, they may be arranged in vertical alignment to thereby simultaneously sever at both the mold 10 and nozzle 12 or they may be in separate vertical planes, as in Fig. 1, to concurrently or sequentially sever at the two vertically spaced apart severing planes.

From the preceding description, it should be apparent that applicant has provided an apparatus designed specifically for the purpose of separating an extruded sealed plastic blank or parison from its source of origination while simultaneously trimming the excess of extruded material from the formed parison.

Modifications may be resorted to within the scope of the appended claim.

What I claim is:

In an apparatus for producing a blown plastic article from a tube of plasticized material extruded through an orifice for enclosure between a pair of closable blow mold sections, each such section having a tube-engaging surface elongated transversely of the orifice for pinching shut the tube without severing the same to thereby leave the pinched tube joined to material filling the orifice when the mold sections are closed, an improved tube severing mechanism comprising an elongated chamfered surface on each of said mold sections displaced toward the orifice from said tube-engaging surface, said chamfered surfaces being inclined oppositely with respect to one another and the surfaces cooperating upon closure to define an open-ended V-shaped groove having its apex adjacent said mating surfaces, a reciprocal cutting element having a V-shaped shearing edge enterable into said groove to sever said tube at the groove apex immediately adjacent the pinched portion of the tube, means for reciprocating said cutting element, and a second shearing edge movable jointly with said cutting element, said second edge being substantially planar to wipe across the orifice, thereby severing the material intermediate the orifice and said groove apex from material filling the orifice.

References Cited in the file of this patent

UNITED STATES PATENTS

| | | |
|---|---|---|
| 2,349,177 | Koptike | May 16, 1944 |
| 2,541,249 | Hobson | Feb. 13, 1951 |
| 2,810,934 | Bailey et al. | Oct. 29, 1957 |

FOREIGN PATENTS

| | | |
|---|---|---|
| 1,029,586 | France | Mar. 11, 1953 |
| 1,114,897 | France | Dec. 26, 1955 |